United States Patent
Singh et al.

(10) Patent No.: US 12,526,184 B2
(45) Date of Patent: Jan. 13, 2026

(54) SYSTEM AND METHOD FOR CONFIGURING A NETWORK FOR ONBOARDING OF A PLURALITY OF DEVICES

(71) Applicant: RAKUTEN MOBILE, INC., Tokyo (JP)

(72) Inventors: Abhishek Singh, San Mateo, CA (US); Rahul Gupta, Indore (IN); Karan Arora, Indore (IN); Aaditya Dharampurikar, Indore (IN); Alok Pawar, Indore (IN)

(73) Assignee: RAKUTEN MOBILE, INC., Tokyo (JP)

(*) Notice: Subject to any disclaimer, the term of this patent is extended or adjusted under 35 U.S.C. 154(b) by 564 days.

(21) Appl. No.: 17/917,102

(22) PCT Filed: Jul. 11, 2022

(86) PCT No.: PCT/US2022/036647
§ 371 (c)(1),
(2) Date: Oct. 5, 2022

(87) PCT Pub. No.: WO2024/015043
PCT Pub. Date: Jan. 18, 2024

(65) Prior Publication Data
US 2024/0223444 A1    Jul. 4, 2024

(51) Int. Cl.
*G06F 7/00* (2006.01)
*G06F 16/185* (2019.01)
(Continued)

(52) U.S. Cl.
CPC ........ *H04L 41/0806* (2013.01); *G06F 16/185* (2019.01); *H04L 41/0266* (2013.01)

(58) Field of Classification Search
CPC ............ H04L 41/0806; H04L 41/0266; G06F 16/185
(Continued)

(56) References Cited

U.S. PATENT DOCUMENTS 7,660,901 B1 * 2/2010 O'Toole, Jr. ........ H04L 41/5054
709/227
8,209,425 B2 * 6/2012 Xia ..................... H04L 41/0806
370/230
(Continued)

FOREIGN PATENT DOCUMENTS

DE    112012004935 T5    8/2014

OTHER PUBLICATIONS

International Search Report dated Nov. 3, 2022 issued by the International Searching Authority in Application No. PCT/US2022/036647.
(Continued)

*Primary Examiner* — Pavan Mamillapalli
(74) *Attorney, Agent, or Firm* — Sughrue Mion, PLLC

(57) ABSTRACT

A system and method are provided to configure a network for onboarding of devices. A hierarchical parameter data file describing configuration parameters of the plurality of devices, such as a Yet Another Next Generation (YANG) model, is received. A parameter database file including a plurality of configuration parameters is populated, with at least one of the configuration parameters being derived from content of the hierarchical parameter data file, and a parameter library is generated based on the parameter database file. A class definition file is generated based on at least one of the database file and the hierarchical parameter data file. Then, for a network function, a corresponding configuration file is generated based on the parameter library and the class definition file, and is provided to the network function for implementation.

18 Claims, 8 Drawing Sheets

(51) Int. Cl.
*G06F 17/00* (2019.01)
*H04L 41/0266* (2022.01)
*H04L 41/0806* (2022.01)

(58) Field of Classification Search
USPC .......................................................... 707/829
See application file for complete search history.

(56) References Cited

U.S. PATENT DOCUMENTS

| | | | | |
|---|---|---|---|---|
| 9,094,299 | B1* | 7/2015 | Rao D.S. | ............ H04L 41/0803 |
| 9,785,412 | B1 | 10/2017 | Huynh Van et al. | |
| 10,360,362 | B2* | 7/2019 | Rattner | ................. H04W 12/04 |
| 11,169,719 | B2* | 11/2021 | Lyon | .................... G06F 3/0605 |
| 11,445,041 | B2* | 9/2022 | Katukam | ................. H04L 67/34 |
| 2008/0183746 | A1* | 7/2008 | Gutjahr | .................. H04L 43/00 |
| | | | | 707/999.102 |
| 2015/0169864 | A1* | 6/2015 | Lin | ......................... H04L 63/20 |
| | | | | 726/6 |
| 2016/0050116 | A1* | 2/2016 | Sheshadri | ........... H04L 41/0813 |
| | | | | 709/221 |
| 2017/0171102 | A1* | 6/2017 | Parker | ................. H04L 12/4641 |
| 2017/0339144 | A1* | 11/2017 | Han | ....................... H04L 9/3268 |
| 2018/0034690 | A1* | 2/2018 | Sivarajan | ................ H04W 4/50 |
| 2020/0045541 | A1* | 2/2020 | Kreishan | ................ H04W 12/06 |
| 2023/0137814 | A1* | 5/2023 | Staufer | ................. H04W 12/06 |
| | | | | 455/411 |
| 2023/0156470 | A1* | 5/2023 | Kweon | ............... H04W 12/069 |
| | | | | 455/410 |

OTHER PUBLICATIONS

Written Opinion dated Nov. 3, 2022 issued by the International Searching Authority in Application No. PCT/US2022/036647.
Translation of Communication issued Nov. 10, 2025 in German Application No.

* cited by examiner

| Status | Schema Name | Vendor | Domain | Software Version | Technology |
|---|---|---|---|---|---|
| ◉ Uploaded | My new | Vendor 1 | RAN | 123 | LTE |
| ◉ Cmdbcreation in Progress | new | Vendor 2 | RAN | V3_0_vf_239 | LTE |
| ◉ Jarcreated | try | Vendor 3 | CORE | 1 | LTE |
| ◉ Jarcreated | try | Vendor 4 | <A HREF='GET BOOTSTRAP.CO... | <a href='getBoot strap.com'>Click... | LTE |
| ◉ Jarcreation in Progress | 3gpp-yang-models -CMDB-3.0.zip | Vendor 5 | RAN | 12 | LTE |
| ◉ Jarcreation in Progress | 3gpp-yang-models -CMDB-3.0.zip | Vendor 6 | RAN | 12 | LTE |
| ◉ Jarcreated | 3gpp-yang-models -CMDB-3.0.zip | Vendor 7 | RAN | 12 | LTE |
| ◉ Jarcreated | 3gpp-yang-models -CMDB-3.0.zip | Vendor 8 | RAN | 12 | LTE |

New Schema

General Information — Data Model Upload — Preview

Select Schema

Domain: RAN
Technology: LTE
Vendor: Vendor 1

Basic Details

Template Name: My New
Software Version: 123

Upload

Date: Fri Jul 09 2021 15:56:44 GMT+0900 (Japan Standard Time)
File Name: 3gpp-yang-models-CMDB-2.1.zip
File Size: 182118
File Type: application/zip

[Previous]  [Cancel] [Save]

FIG. 3D

SYSTEM AND METHOD FOR CONFIGURING A NETWORK FOR ONBOARDING OF A PLURALITY OF DEVICES

CROSS REFERENCE TO RELATED APPLICATIONS

This application is a National Stage of International Application No. PCT/US2022/036647 filed Jul. 11, 2022.

TECHNICAL FIELD

Apparatuses, systems, and methods in accordance with one or more embodiments are generally directed to the configuration of networks and the network functions therein to "onboard" a group of devices. The system generally provides for deriving some or all of the necessary configuration data from a hierarchical parameter data file, such as a YANG file, so that the data files needed for configuration can be more quickly easily generated with reduced manual data entry.

BACKGROUND

Modern networked systems, such as mobile phone networks, Internet connections, and cloud computing systems, must manage interactions between a wide variety of third-party devices connecting to the system.

When a new device is to be accepted into the network, there is what is known as an "onboarding" process, where the network is configured to recognize and respond to the device. Particularly in the context of a mobile phone network, a vendor or manufacturer of such devices (e.g. phones) will often seek to have all their devices onboarded to the network collectively, by providing information about the device models to the network provider. The provider can then configure their systems for all such models accordingly, by generating one or more configuration "schema" which collectively describe the configuration parameters of these models and establish the necessary connection protocols. This can be a lengthy process, but it is required to ensure stable and secure connections between the devices and the network as a whole.

SUMMARY

It is an object of the disclosed system and method to enable an onboarding configuration process with minimal data entry.

It is another object of the disclosed system and method to reduce time expenditure and human error in an onboarding configuration process.

It is yet another object of the disclosed system and method to exploit pre-existing network parameter files in order to derive data for an onboarding configuration process.

These and other objects may be attained in a system and method for configuring a network for onboarding of a plurality of devices.

In accordance with certain embodiments of the present disclosure, a method is provided for configuring a network for onboarding of a plurality of devices. The method includes receiving a hierarchical parameter data file describing configuration parameters of the plurality of devices; by a processor, populating a parameter database file including a plurality of configuration parameters, at least one of the configuration parameters being derived from content of the hierarchical parameter data file; by a processor, generating a parameter library based at least in part on the parameter database file; by a processor, generating a class definition file based at least in part on at least one of the parameter database file and the hierarchical parameter data file; by a processor, generating at least one configuration file corresponding to a network function interfacing with at least one device of the plurality of devices, the configuration file based at least in part on the parameter library and the class definition file; and providing the configuration file to the corresponding network function for implementation thereat.

In accordance with other embodiments of the present disclosure, a system is provided for configuring a network for onboarding of a plurality of devices. The system includes a processor. The processor executes software instructions to receive a hierarchical parameter data file describing configuration parameters of the plurality of devices; populate a parameter database file including a plurality of configuration parameters, at least one of the configuration parameters being derived from content of the hierarchical parameter data file; generate a parameter library based at least in part on the parameter database file; generate a class definition file based at least in part on at least one of the parameter database file and the hierarchical parameter data file; generate at least one configuration file corresponding to a network function interfacing with at least one device of the plurality of devices, the configuration file based at least in part on the parameter library and the class definition file; and provide the configuration file to the corresponding network function for implementation thereat.

In accordance with still other embodiments of the present disclosure, a non-transitory computer-readable recording medium is provided. The medium has recorded thereon instructions executable by at least one processor to perform a method of configuring a network for onboarding of a plurality of devices. The method includes receiving a hierarchical parameter data file describing configuration parameters of the plurality of devices; by a processor, populating a parameter database file including a plurality of configuration parameters, at least one of the configuration parameters being derived from content of the hierarchical parameter data file; by a processor, generating a parameter library based at least in part on the parameter database file; by a processor, generating a class definition file based at least in part on at least one of the parameter database file and the hierarchical parameter data file; by a processor, generating at least one configuration file corresponding to a network function interfacing with at least one device of the plurality of devices, the configuration file based at least in part on the parameter library and the class definition file; and providing the configuration file to the corresponding network function for implementation thereat.

Additional aspects, details, and advantages of the disclosed system and method will be set forth, in part, in the description and figures which follow.

BRIEF DESCRIPTION OF THE DRAWINGS

Features, advantages, and significance of exemplary embodiments of the disclosure will be described below with reference to the accompanying drawings, in which like signs denote like elements, and wherein:

FIGS. 3A-3D are depictions of an illustrative example of a graphic user interface for deriving various data files from a hierarchical parameter data file, in accordance with an exemplary embodiment of the present invention.

DETAILED DESCRIPTION

Figure 1A:
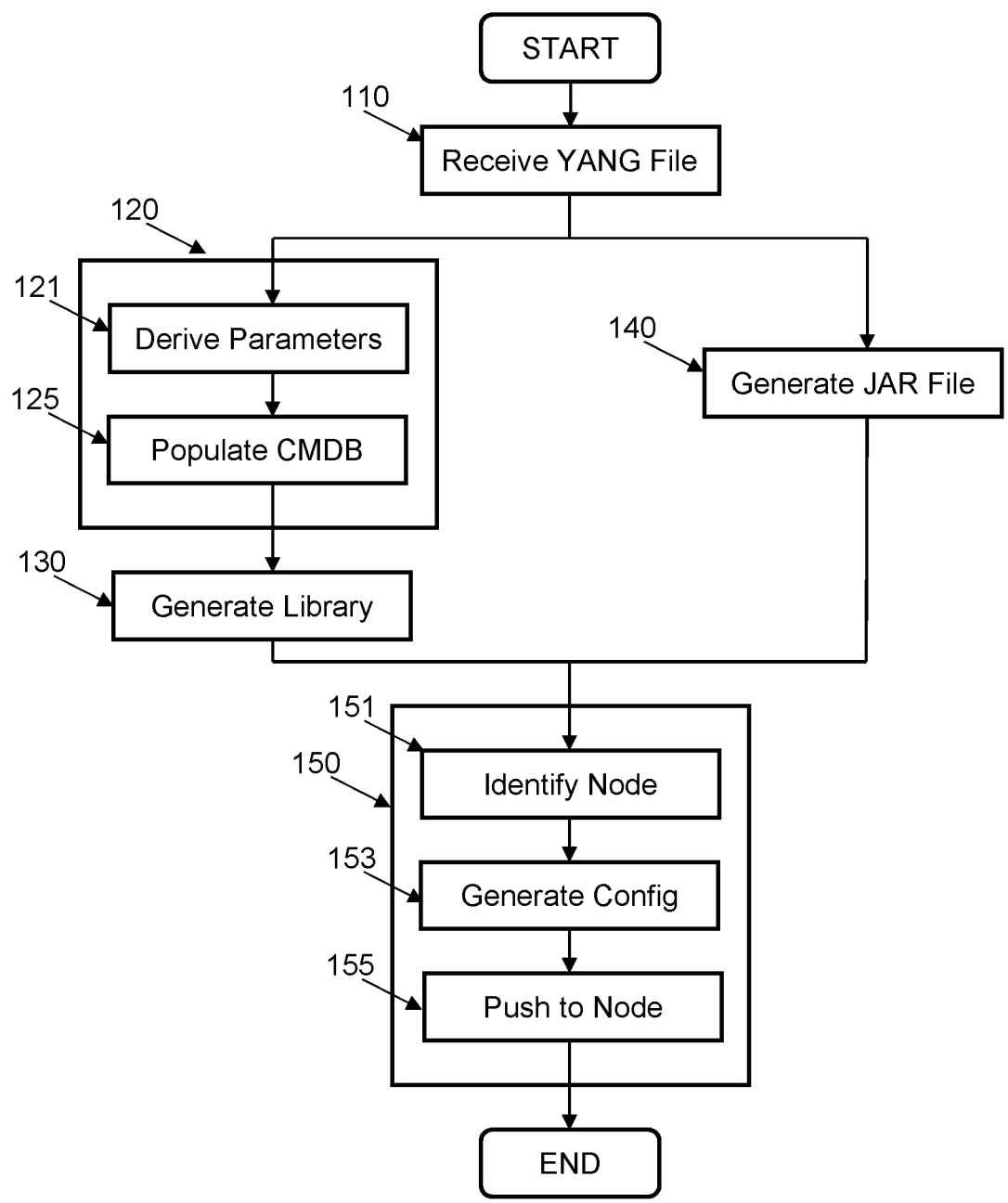
FIGS. 1A and 1B are flow diagrams illustrating flows of processes for configuring network functions in a network on the basis of a hierarchical parameter data file, in accordance with an exemplary embodiment of the present invention.

The following detailed description of example embodiments refers to the accompanying drawings. The same reference numbers in different drawings may identify the same or similar elements.

The foregoing disclosure provides illustrations and descriptions, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

It is noted that the principles disclosed herein are generally applicable to all forms of networks, including but not limited to internet service provider networks such as optical fiber and cable networks; traditional phone networks; and both wired and wireless networks in a structure, complex, or other localized area. However, throughout the disclosure, the network being analyzed and managed by the disclosed system will be primarily referred to as a mobile network for convenience and clarity purposes.

As discussed briefly in the background of this disclosure, interactions between a network and a hardware vendor or other network device manufacturer require the use of configuration schema, which will be used to negotiate these interactions. When a vendor seeks to "onboard"—establish connection protocols with—a network, this schema must be provided to describe the configuration requirements of the vendor's devices.

(It is noted that the vendor and the manufacturer of a given device may be the same or different businesses, and when different, each may handle different aspects of what will be described herein as the actions of "the vendor." However, the distinction between these roles is not relevant to the present disclosure. Therefore, for the sake of brevity, the vendor and the manufacturer will be treated as a single unified entity herein, and the terms will be used interchangeably.)

The schema normally takes the form of a CMDB (Configuration Management Database) file or similar, a telecom parameter library derived from the CMDB file, and a JAR (Java ARchive) and/or JSON (JavaScript Object Notation) file. By combining the data from these files, an appropriate XML file can be automatically generated to describe interactions between any specific combination of devices or systems of the network and of the manufacturer. Such an XML file is generated and "pushed" to each network node or network function to configure the interaction protocols for that node.

It is also noted that the CMDB, JAR, and YANG files, and various combinations thereof, may also be used for enabling other configuration operations. The contents and format of each of these files are standardized such that each of these configuration operations can operate correctly.

A CMDB file generally describes the configuration of each of the network devices of the manufacturer in a database format. The CMDB file must be uniquely generated for each pairing of manufacturer and network, according to a template. This would normally require manual entry of a large amount of data into a CMDB generation tool, or directly into the template. Such entry is time-consuming and tedious. It is also error-prone, requiring careful review and frequent correction before any configuration based on the CMDB can proceed.

The YANG ("Yet Another Next Generation") modeling language is used to define configuration and state data for network management protocols. YANG uses an XML tree format with numerous data types, and can store parameter data in a hierarchy, defining the structure for the parameters where such a structure is applicable. A YANG file can also be easily converted to JSON format if such is more convenient for interactions between the particular network and the particular manufacturer. Due to their convenience, many manufacturers will have aspects of their configuration data already defined and organized in the form of a YANG file.

Embodiments of the present invention are based on the realization, previously unrecognized, that a considerable majority of the information needed for the CMDB and JAR files, in particular the relevant xpaths and static parameters, can be trivially derived from the data in a manufacturer's YANG file. If a manufacturer has a standard YANG file already prepared, as most manufacturers of networking-capable devices do, using the data within the YANG file to derive this information can significantly reduce the amount of manual entry required to configure the CMDB and JAR files.

In certain embodiments, only some and not all of the parameters for the CMDB file are derived from the YANG file. More specifically, in certain embodiments, the values of certain dynamic parameters—parameters which are defined by the vendor and which can potentially change between run-times—are still manually entered through a software tool such as a suitable graphical user interface, preferably after the values of the other parameters are successfully derived from the YANG file.

Practical testing of embodiments according to the disclosed invention has determined that all static parameters (that is, all parameters that are not dynamic parameters) which are required for a standard configuration schema can be successfully derived from the data in a YANG file without other input. Additionally, even when dynamic parameters are required, on average about 70% of the data entry into a typical CMDB generation tool can be replaced by automatic conversion from the YANG file, resulting in considerable savings of time and reduction of error.

A flow of processes for configuring a network, and more specifically the network functions thereof, on the primary basis of a YANG file or other hierarchical parameter data file will now be described with reference to FIGS. 1A and 1, according to an embodiment of the invention.

At 110, a hierarchical parameter data file is received or retrieved, which describes configuration parameters of a plurality of devices which are to be connected to a network. Although other formats of parameter data files are within the scope of the invention, a file formatted according to the YANG modeling language (for brevity, termed a "YANG file" herein) is used in the present embodiment, and will be assumed for convenience hereinafter. The YANG file contents and format for a hierarchical parameter data file may be in accordance with standard YANG file structures.

The devices may be organized by device model, with the assumption that the same general configuration parameters will apply to all devices of the same device model. Other organizational groupings of the devices, including treating all devices as having individual parameters, are also possible and within the scope of the invention.

At 120, a parameter database file is generated, and populated to include a plurality of configuration parameters in database format. Although other formats of parameter database files are within the scope of the invention, a CMDB file is used in the present embodiment, and will be assumed for convenience hereinafter. A CMDB file content and format may be in accordance with standard CMDB file structures.

More specifically, in the depicted embodiment, at 121, the parameters to populate the database file are derived from the content of the YANG file, and at 125, the CMDB file is populated with the parameters.

Figure 1B:
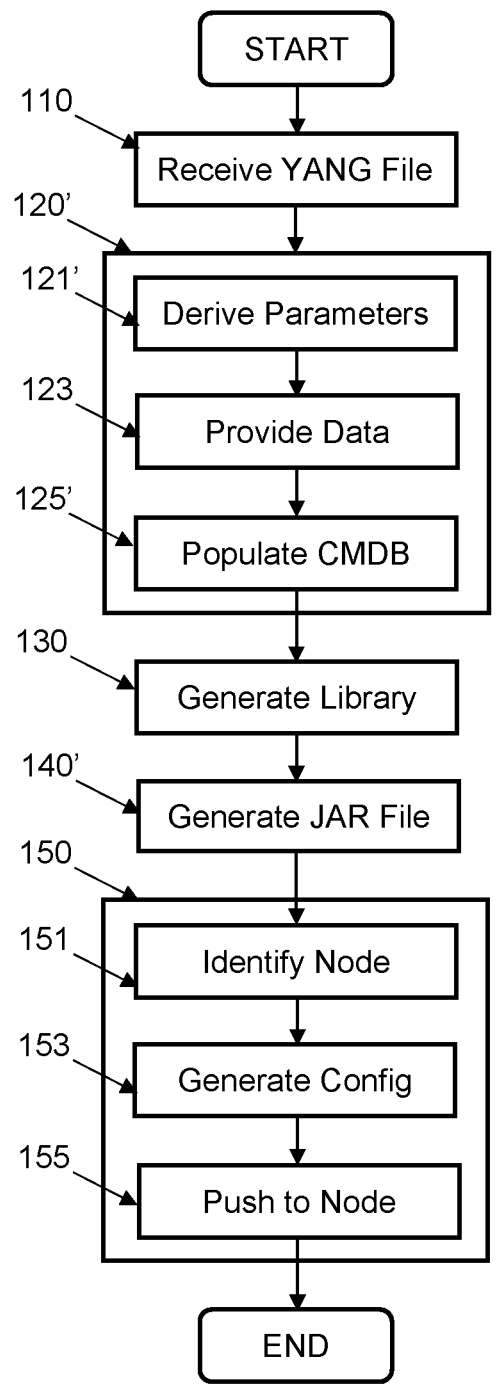

In the depicted embodiment, it is assumed that each configuration parameter added to the CMDB file is derived from content of the YANG file, although, as will be noted further herein, particularly with reference to FIG. 1B, this is not a requirement of the invention.

At 130, a telecom parameter library is prepared, based on the content of the CMDB file and, in certain embodiments and configurations, additionally based on other stored or directly-provided data. The parameter library preferably is of a format comparable to the format of the CMDB file, and methods and tools for generating a parameter library based on a provided (e.g., uploaded) CMDB file are known in the art.

In certain embodiments, operation 130 and the existence of the library file is omitted, and the CMDB file is referenced directly for any data which would be gathered from the library file. However, in other embodiments a library file is prepared, as this file format is more easily referenced should a user or an automated system wish to check the values of a particular parameter.

It is noted that operations 120 and 130 can be merged in certain embodiments, with the necessary YANG file content being converted directly into the parameter library format. However, the depicted embodiment exploits existing methods of preparing a parameter library based on the CMDB file, and therefore uses the CMDB file as an intermediary. Additionally, it is more convenient to incorporate additional data provided as input during the population of the CMDB file rather than at other stages. As will be noted further herein, particularly with reference to FIG. 1B, such additional data is sometimes necessary.

At 140, a class definition file is generated. Although other formats of class definition files are within the scope of the invention, a JAR file is preferred at present, and will be assumed for convenience hereinafter. The JAR file contents and format for a class definition file may be in accordance with standard JAR file structures.

In the embodiment illustrated in FIG. 1A, the contents of the JAR file are derived from the contents of the YANG file, and in certain embodiments and configurations is also based on other stored or directly-provided data. This derivation is similar to that of the contents of the CMDB file, especially for those contents which are identical but for the file format.

In the embodiment illustrated in FIG. 1A, operation 140 is simultaneous with operations 120 and 130, to conserve time. If simultaneous execution is not possible, due to hardware limitations or other reasons, operation 140 may be executed either before or after operations 120 and 130.

At 150, connection parameters for a specified network function, network node, or similar are configured. This is known in the art as a configuration "push." At this stage, the CMDB and YANG files are no longer necessary; the library file and the JAR file are sufficient to complete the operations that follow.

Specifically, at 151, the network function or network node, and its qualities, are identified. In particular, an xpath or similar is preferably provided.

At 153, a configuration file for the network node is generated. Although other formats of configuration files are within the scope of the invention, an XML file is preferred at present, and will be assumed for convenience hereinafter. The configuration file is based on the parameter library and class definition file contents relevant to the identified network node, and in certain embodiments and configurations is also based on other stored or directly-provided data. Preferably, the parameters are mapped based on the provided xpath. When the class definition file is a JAR file, it can be converted to the XML file, with the necessary data related to the xpath drawn from the parameter library and added. The XML file contents and format for a configuration file may be in accordance with standard XML file structures.

At 155, the configuration file is "pushed" or otherwise provided to the network node. In different implementations of the network, this can involve transmittal to the individual devices of the network node, to the network node or network element, or to an element management system (EMS) managing the node or element.

Operation 150 may be repeated for an arbitrary number of network functions, network nodes and elements, and individual devices, using the same parameter library and JAR file, so long as all such devices were described in the original YANG file. It can be assumed that a complete YANG file for a given vendor will describe all devices manufactured by the vendor.

As noted above, the embodiment depicted in FIG. 1A assumes that all parameters which are relevant to the configuration, and therefore which will be added first to the CMDB file and then to the parameter library, can be derived directly from the contents of the YANG file. This is true, for example, when all relevant parameters are not dynamic but static, as at least some embodiments of the invention are capable of deriving any possible static parameter from a YANG file which is complete may be properly formatted in accordance with standardized YANG file formats.

However, when dynamic parameters are required, and those dynamic parameters cannot be completely derived from the YANG file, the process flow must be altered. In one such alteration, illustrated in FIG. 1B, operation 120 is altered to 120'. As part of operation 120', parameters are still derived at 121', but not all such parameters needed for the CMDB file. The dynamic parameters which cannot be completely derived from the YANG file are directly provided at 123 and added, along with the derived parameters, to the CMDB file at 125'. In the alternative, at 123, sufficient additional data is provided that the missing dynamic parameters can be derived from this additional data in combination with the data in the YANG file.

Additionally, having all relevant dynamic parameters is also necessary to complete the JAR file. Therefore, the generation of the JAR file cannot occur simultaneously with the generation of the CMDB file and parameter library at 120 and 130, but is instead delayed until after 130. The content of the parameter library, instead of the YANG file itself, is then used to generate the content of the JAR file at 140', as the parameter library includes sufficient data to generate the JAR file due to the direct provision of the additional data at 123.

The approach illustrated in FIG. 1B can be implemented even when there are no relevant dynamic parameters, as certain respective combinations of parameters in the CMDB and JAR files may make it more convenient to derive or copy one from the other than to derive both directly from the YANG file.

Figure 2:
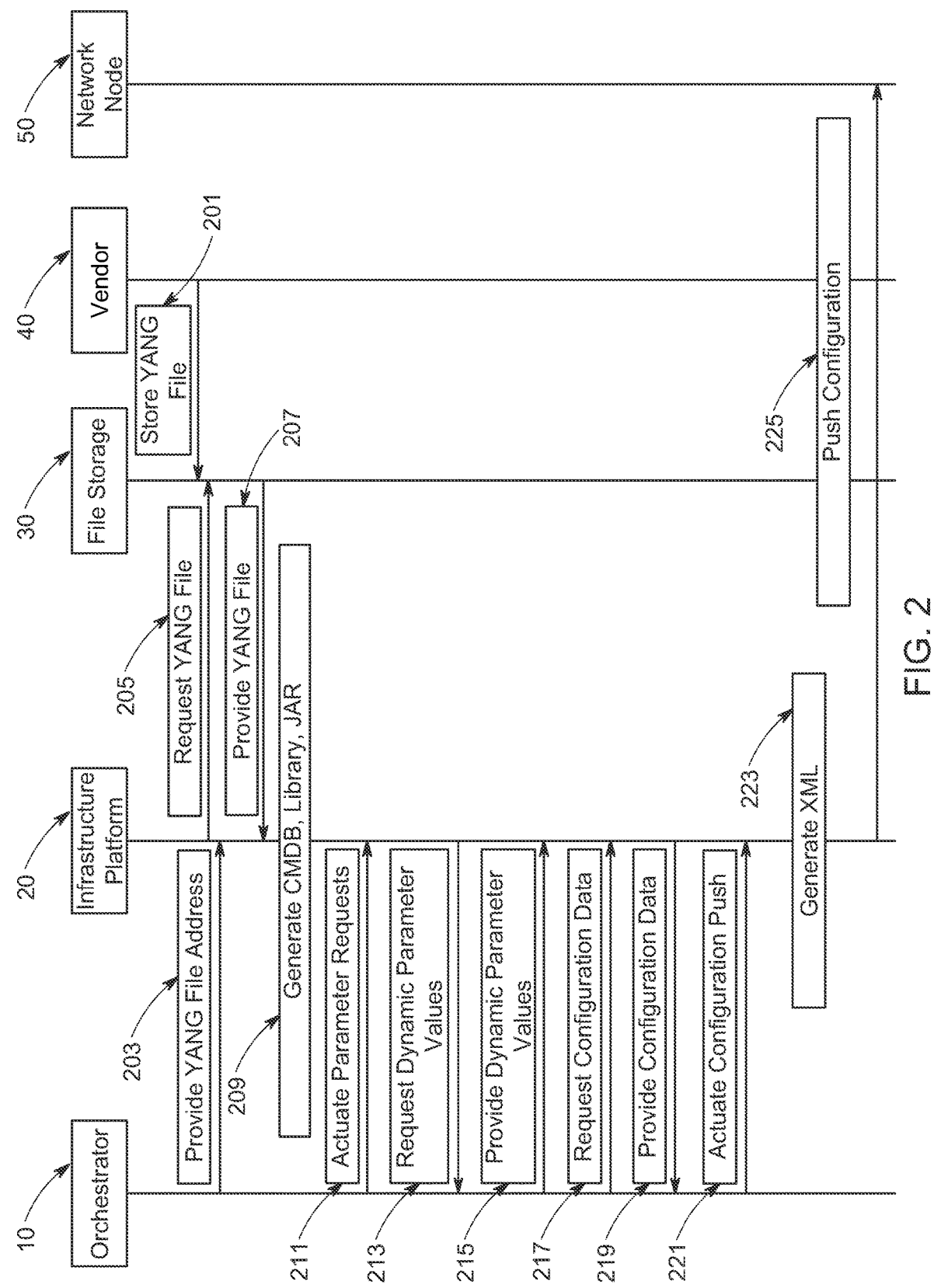
FIG. 2 is a functional flow diagram illustrating a flow of processes for configuring network functions in a network on the basis of a hierarchical parameter data file, in accordance with an exemplary embodiment of the present invention.

An illustrative functional flow diagram of interactions between systems during a process for configuring network functions on the primary basis of a YANG file or other hierarchical parameter data file will now be described with reference to FIG. 2, according to an embodiment of the invention.

In the depicted embodiment, the systems include a network orchestrator 10. The orchestrator 10 is the primary control device for the operations described previously, among others. Using the orchestrator 10, and in particular one or more interfaces provided through the orchestrator 10, an agent of a network operator company can configure aspects of the network by actuating processes in the other systems. For the purposes of this disclosure, it is not relevant whether the network orchestrator 10 operates automatically and, if not, who operates it and how. Therefore, for brevity, when an agent of the network operator company might operate the network orchestrator 10 to take an action, the disclosure will describe this as if the network orchestrator 10 took the action.

In the depicted embodiment, the systems include a network infrastructure platform 20. The platform 20 preferably executes the various operations described above responsive to the actuation of the orchestrator 10. It is noted that certain embodiments combine the orchestrator 10 and the platform 20 in a single system. However, the arrangements of networks frequently makes it more convenient for the platform 20 to be a server, which is controlled from a remote terminal implementing the orchestrator 10.

In the depicted embodiment, the systems include a file storage system 30. This can be a server or a cloud-based storage. One preferred implementation is a MinIO cloud storage system, although the invention is not limited thereto. The vendor stores its YANG file (or other hierarchical parameter data file) on the file storage system 30 for access by the network operator, and usually also by other parties. The file storage system 30 can be under the partial or total control of either the vendor or the network operator, so long as both are provided with sufficient access for their respective operations described below. In certain embodiments, the file storage system 30 is incorporated within the infrastructure platform 20 or within a vendor system 40 (described below).

In the depicted embodiment, the systems include a vendor or manufacturer system 40. The vendor system 40 is the primary control device for operations actuated by agents of the vendor or manufacturer. There is only one such operation depicted in FIG. 2, which interacts with the file storage system 30, and in embodiments where this is an expected level of simplicity, the vendor system 40 is preferably a remote interface of the file storage system 30 executing on any suitable device. For the purposes of this disclosure, it is not relevant whether the vendor system 40 operates automatically and, if not, who operates it and how. Therefore, for brevity, when an agent of the vendor might operate the vendor system 40 to take an action, the disclosure will describe this as if the vendor system 40 itself took the action.

In the depicted embodiment, the systems include at least one network function or network node 50. The network node 50 manages a network element of a physical device, or of a group of physical devices having similar networking properties. Due to the similar properties, the devices can be managed in the same or similar manner using the same configuration file. In the depicted embodiment, it is assumed that all devices managed by the network node 50 are the products of the vendor.

At 201, the vendor system 40 stores (for example, uploads) a YANG file to the file storage system 30. The file is stored at a particular address which is assigned for YANG file storage for this vendor. This may be a general storage location that the vendor uses to supply the YANG file to anyone who needs it, or a location specific to the network provider with the upload being part of the vendor's request to be onboarded, among other possibilities.

At 203, the orchestrator 10 provides the address (e.g. a network path) of the YANG file to the network infrastructure platform 20. The platform 20 uses this address to request the YANG file from the file storage system 30 at 205, which provides it at 207.

At 209, the platform 20 begins the generation of the CMDB, library, and JAR files on the basis of the provided YANG file. This operation can be, for example, as previously disclosed with respect to FIG. 1A or FIG. 1B.

Specific input may be provided by the orchestrator 10, if necessary due to the execution of operation 123 of FIG. 1B, or similar operations. For example, at 211, the orchestrator actuates a system to provide any necessary data. The platform 20 responds at 213 by requesting information on the dynamic parameters, which in certain embodiments is by means of a GET command. The orchestrator 10 provides the necessary values at 215, which in certain embodiments is by means of a SET command. These values may be more specifically retrieved from another module or database; for example, an IP Address Manager (IPAM) module.

At 217, the orchestrator 10 optionally requests the derived configuration data in the parameter library, for local storage or other purposes. In particular, the orchestrator 10 preferably requests the static parameters which are not based on any input provided at 215. The platform 20 complies at 219 by providing the requested data, which in certain embodiments is by means of a COPY command.

At 221, the orchestrator 10 actuates a configuration "push" for a particular network node, namely network node 50 in the depicted example. At 223, the platform 20 responds by generating the XNIL file for the network node 50, for example according to operation 153 of FIG. 1A. And at 225, the XML file is transmitted or otherwise "pushed" to network node 50 for configuration thereof, for example according to operation 155 of FIG. 1A.

Illustrative examples of GUI pages for configuring a network on the primary basis of a YANG file or other hierarchical parameter data file will now be described with reference to FIGS. 3A-3D. It is noted that these examples are in no way controlling, as a wide variety of suitable interfaces are possible for the disclosed invention, but are merely intended as an illustrative example of how such an interface might be implemented and operated in practice.

In a general management GUI page illustrated in FIG. 3A, a list 310 of configuration schema is provided. The list identifies all schema which are fully generated or in the process of generation. In the illustrative example, parameters provided in the list include: a status, which describes whether generation ("creation") of the CMDB, the library, or the JAR is in progress at present, or has not started, or if the JAR is completed (as the expected final stage of the schema generation); the name of the schema; the vendor or manufacturer associated with the schema; a domain for the schema, such as "RAN" (Radio Access Network); an applicable version of the generated schema; and a network technology, such as LTE or 5G.

In the illustrative example, controls are presented in the upper right of the page. In particular, an "add schema" control 321 is provided. Actuation of the control 321 causes the GUI to open another page, illustrated in FIG. 3B.

Figure 3B:
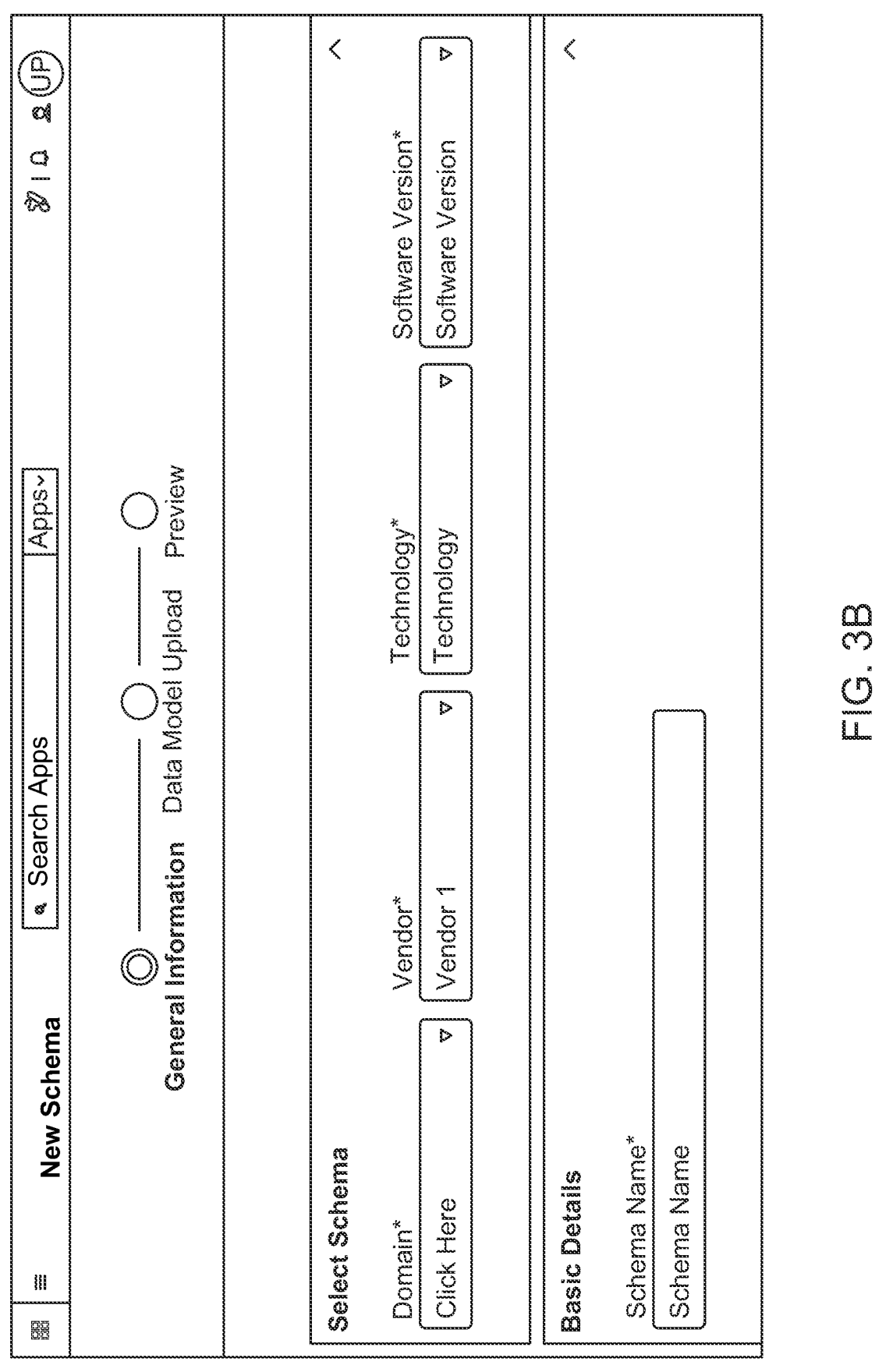

In a schema identification page illustrated in FIG. 3B, controls are provided to provide identifying information for the schema to be added. In the illustrative example, the provided information includes a name for the schema, and the applicable domain, vendor or manufacturer, technology, and version. Such information will appear in the list in the general management GUI page of FIG. 3A once generation of the schema begins. Various suitable selector forms and other data entry means for each piece of information are well known in the art and need not be detailed.

Figure 3C:
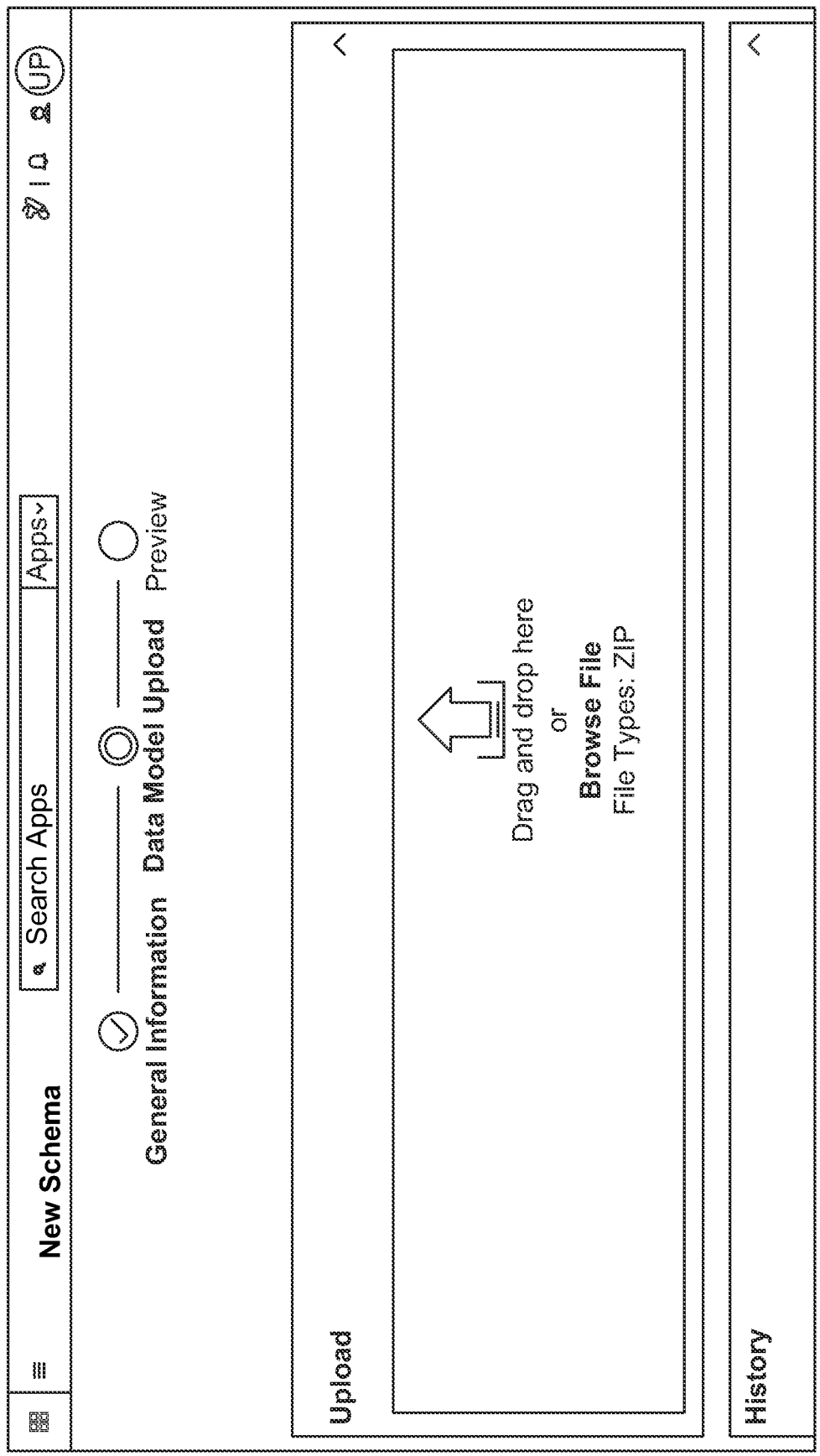

Once all information is provided, a user may proceed to another GUI page, illustrated in FIG. 3C.

In an upload page illustrated in FIG. 3C, a means to upload a YANG file or other hierarchical parameter data file is provided. In the illustrative example, the file can be selected for upload either through a "drag and drop" from a file folder representation, or by opening a file browser. Other upload interfaces are well known in the art and need not be detailed.

Once the upload is completed, a user may proceed to another GUI page, illustrated in FIG. 3D.

In a preview page illustrated in FIG. 3D, the information provided in the schema identification page of FIG. 3B, and information related to or extracted from the YANG file uploaded through the upload page of FIG. 3C, is presented for review. If the information is satisfactory to the user, they may confirm the submission. The system then returns to the general management GUI page of FIG. 3A. A confirmation message optionally appears that states that the addition was successful.

A schema can be seen at 330 in FIG. 3A, with a status 331 of "uploaded" which indicates that a YANG file is uploaded but no generation of the other files has begun. When the row in the list for the YANG file is selected or highlighted, controls 333, 335, and 337 appear and are actuable. Specifically, JAR generation control 333 actuates the complete generation of a schema, including CMDB file, parameter library, and JAR file. CMDB generation control 335 actuates generation of the CMDB file and parameter library alone, leaving the JAR stage for later. Deletion control 337 removes the schema 330 from the list 310.

In certain embodiments, JAR generation control 333 actuates the generation of the JAR file alone. If the system determines that dynamic parameters which cannot be derived from the YANG file are required for the configuration, JAR generation control 333 is disabled until the generation of the CMDB file and parameter library is completed, such that the method illustrated in FIG. 1B, or a similar method, can be completed in order. If the system determines that all required parameters can be derived from the YANG file, JAR generation control 333 is enabled and can be actuated before or after actuation of the CMDB generation control 335.

Figure 4:
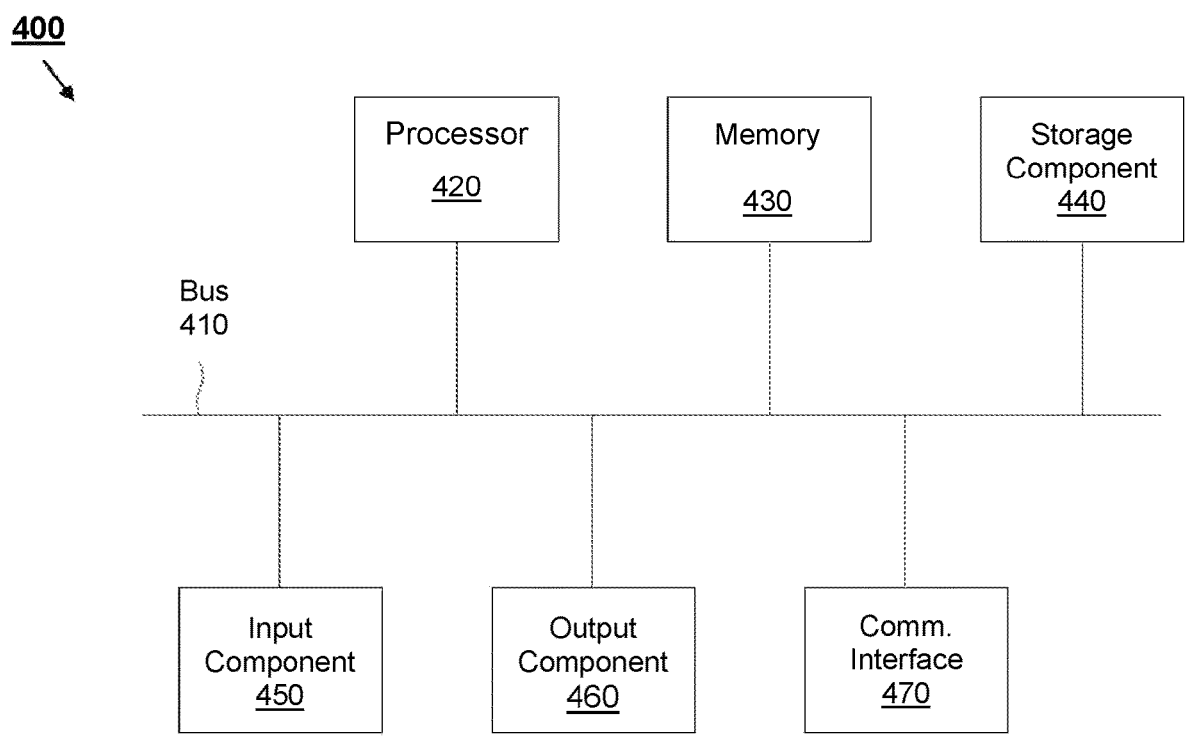
FIG. 4 is a diagram of components of one or more devices, in accordance with an exemplary embodiment of the present invention.

FIG. 4 is a diagram of components of one or more devices according to an embodiment. Device 400 may correspond to any computing device described above (such as network orchestrator 10, network infrastructure platform 20, file storage system 30, vendor system 40, and network node 50), as well as to a processor executing any described software module or method, and to a memory containing any described data storage.

As shown in FIG. 4, the device 400 may include a bus 410, a processor 420, a memory 430, a storage component 440, an input component 450, an output component 460, and a communication interface 470. It is understood that one or more of the components may be omitted and/or one or more additional components may be included.

The bus 410 includes a component that permits communication among the components of the device 400. The processor 420 is implemented in hardware, firmware, or a combination of hardware and software. The processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The process 420 includes one or more processors capable of being programmed to perform a function.

The memory 430 includes a random access memory (RAM), a read only memory (ROM), and/or another type of dynamic or static storage device (e.g., a flash memory, a magnetic memory, and/or an optical memory) that stores information and/or instructions for use by the processor 420.

The storage component 440 stores information and/or software related to the operation and use of the device 400. For example, the storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 450 includes a component that permits the device 400 to receive information, such as via user input (e.g., a touch screen display, a keyboard, a keypad, a mouse, a button, a switch, and/or a microphone). The input component 450 may include a sensor for sensing information (e.g., a global positioning system (GPS) component, an accelerometer, a gyroscope, and/or an actuator).

The output component 460 includes a component that provides output information from the device 400 (e.g., a display, a speaker, and/or one or more light-emitting diodes (LEDs)).

The communication interface 470 includes a transceiver-like component (e.g., a transceiver and/or a separate receiver and transmitter) that enables the device 400 to communicate with other devices, such as via a wired connection, a wireless connection, or a combination of wired and wireless connections. The communication interface 470 may permit device 400 to receive information from another device and/or provide information to another device. For example, the communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

The device 400 may perform one or more processes described herein. The device 400 may perform operations based on the processor 420 executing software instructions stored by a non-transitory computer-readable medium, such as the memory 430 and/or the storage component 440. A computer-readable medium is defined herein as a non-transitory memory device. A memory device includes memory space within a single physical storage device or memory space spread across multiple physical storage devices.

Software instructions may be read into the memory 430 and/or the storage component 440 from another computer-readable medium or from another device via the communication interface 470. When executed, software instructions stored in the memory 430 and/or storage component 440 may cause the processor 420 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of configuring a network for onboarding of a plurality of devices, the method comprising:
receiving a hierarchical parameter data file describing configuration parameters of the plurality of devices, the hierarchical parameter data file being a predefined file comprising a plurality of predefined different static parameters respectively for a plurality of different device models;
by a processor, populating a parameter database file including a plurality of configuration parameters, at least one of the configuration parameters being automatically derived from content of the hierarchical parameter data file;
by a processor, generating a parameter library based at least in part on the parameter database file;
by a processor, generating a class definition file based at least in part on at least one of the parameter database file and the hierarchical parameter data file;
by a processor, generating at least one configuration file corresponding to a network function interfacing with at least one device of the plurality of devices, the configuration file based at least in part on the parameter library and the class definition file; and
providing the configuration file to the corresponding network function for implementation thereat.

2. The method of claim 1, wherein each static configuration parameter included in the parameter database file is derived from the contents of the hierarchical parameter data file.

3. The method of claim 1, wherein the hierarchical parameter data file is formatted according to the Yet Another Next Generation (YANG) modeling language.

4. The method of claim 1, wherein the parameter database file is a Configuration Management Database (CMDB) file.

5. The method of claim 1, wherein the class definition file is a Java Archive (JAR) file.

6. The method of claim 1, wherein the configuration file is an Extensible Markup (XML) file.

7. A system for configuring a network for onboarding of a plurality of devices, the system comprising a processor executing software instructions to:
receive a hierarchical parameter data file describing configuration parameters of the plurality of devices, the hierarchical parameter data file being a predefined file comprising a plurality of predefined different static parameters respectively for a plurality of different device models;
populate a parameter database file including a plurality of configuration parameters, at least one of the configuration parameters being automatically derived from content of the hierarchical parameter data file;
generate a parameter library based at least in part on the parameter database file;
generate a class definition file based at least in part on at least one of the parameter database file and the hierarchical parameter data file;
generate at least one configuration file corresponding to a network function interfacing with at least one device of the plurality of devices, the configuration file based at least in part on the parameter library and the class definition file; and
provide the configuration file to the corresponding network function for implementation thereat.

8. The system of claim 7, wherein each static configuration parameter included in the parameter database file is derived from the contents of the hierarchical parameter data file.

9. The system of claim 7, wherein the hierarchical parameter data file is formatted according to the Yet Another Next Generation (YANG) modeling language.

10. The system of claim 7, wherein the parameter database file is a Configuration Management Database (CMDB) file.

11. The system of claim 7, wherein the class definition file is a Java Archive (JAR) file.

12. The system of claim 7, wherein the configuration file is an Extensible Markup (XML) file.

13. A non-transitory computer-readable recording medium having recorded thereon instructions executable by at least one processor to perform a method of configuring a network for onboarding of a plurality of devices, the method comprising:

receiving a hierarchical parameter data file describing configuration parameters of the plurality of devices, the hierarchical parameter data file being a predefined file comprising a plurality of predefined different static parameters respectively for a plurality of different device models;

populating a parameter database file including a plurality of configuration parameters, at least one of the configuration parameters being automatically derived from content of the hierarchical parameter data file;

generating a parameter library based at least in part on the parameter database file;

generating a class definition file based at least in part on at least one of the parameter database file and the hierarchical parameter data file;

generating at least one configuration file corresponding to a network function interfacing with at least one device of the plurality of devices, the configuration file based at least in part on the parameter library and the class definition file; and providing the configuration file to the corresponding network function for implementation thereat.

14. The recording medium of claim 13, wherein each static configuration parameter included in the parameter database file is derived from the contents of the hierarchical parameter data file.

15. The recording medium of claim 13, wherein the hierarchical parameter data file is formatted according to the Yet Another Next Generation (YANG) modeling language.

16. The recording medium of claim 13, wherein the parameter database file is a Configuration Management Database (CMDB) file.

17. The recording medium of claim 13, wherein the class definition file is a Java Archive (JAR) file.

18. The recording medium of claim 13, wherein the configuration file is an Extensible Markup (XML) file.

* * * * *